United States Patent [19]

Isayama et al.

[11] 4,184,168
[45] Jan. 15, 1980

[54] INK-ON-DEMAND TYPE INK JET HEAD DRIVING CIRCUIT

[75] Inventors: Takuro Isayama, Tokyo; Tsutomu Sato, Yokohama, both of Japan

[73] Assignee: Ricoh Company, Ltd., Tokyo, Japan

[21] Appl. No.: 952,261

[22] Filed: Oct. 18, 1978

[30] Foreign Application Priority Data

Oct. 25, 1977 [JP] Japan .................... 52 127805

[51] Int. Cl.² .................................. G01D 15/18
[52] U.S. Cl. ......................... 346/140 R; 346/75
[58] Field of Search .................... 346/75, 140 R

[56] References Cited

U.S. PATENT DOCUMENTS

| | | | |
|---|---|---|---|
| 3,828,357 | 8/1974 | Koeblitz | 346/140 R |
| 4,072,958 | 2/1978 | Hayami et al. | 346/140 R |

*Primary Examiner*—George H. Miller, Jr.
*Attorney, Agent, or Firm*—Burgess, Ryan and Wayne

[57] ABSTRACT

A circuit for driving an ink-on-demand type ink jet head comprising a comparator for comparing the video signal with a reference signal and delivering a high-level output when the level of the video signal is higher than or equal to said reference voltage or a low-level output when the level of the video signal is lower than the reference voltage; a pulse synchronization circuit for receiving the output of the comparator and a printing sync pulse and delivering an output pulse in synchronism with the printing sync pulse when the pulse synchronization circuit has received said high-level or low-level output from the comparator; and a sample-hold circuit for holding a peak value of the video signal, the output of the sample-hold circuit being delivered to a high-voltage energization circuit for driving an ink jet head, the output of the pulse synchronization circuit being applied to the sample-hold circuit so as to reset the peak value held thereby.

4 Claims, 6 Drawing Figures

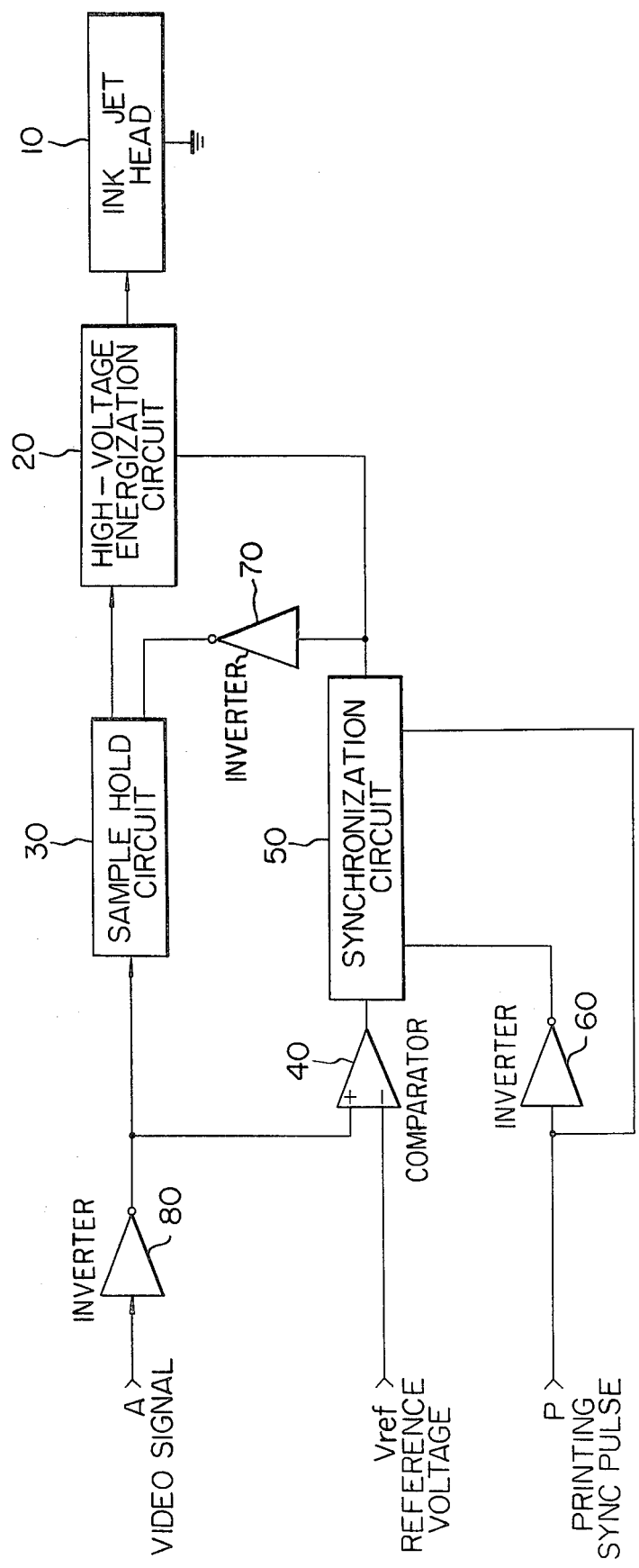

INK-ON-DEMAND TYPE INK JET HEAD DRIVING CIRCUIT

BACKGROUND OF THE INVENTION

The present invention relates to a circuit for driving an ink-on-demand type ink jet head.

In a recording system using an ink-on-demand type ink jet head, the crest value of the ink jet control pulse is modulated or varied depending upon the level of the video signal which represents the density of an elementary area of an image reproduced. In response to the crest value of the printing pulse, the size of the ink jet or droplet may be varied so that the black areas may be represented by the large-sized ink dots, the relatively white areas may be very small ink dots and the grey areas may be represented by ink dots of varying intermediate sizes.

In order to drive the ink-on-demand type ink jet head, the high-voltage pulse is applied to a piezoelectric transducer with the mechanical output comprising, in general, a piezoelectric crystal plate and a metallic diaphragm. When applied with the high-voltage pulse, the piezoelectric transducer is deformed to pressurize an ink chamber in communication with an ink jet nozzle, whereby the ink jet is discharged through the nozzle. When the high-voltage pulse is removed, the piezoelectric transducer returns to its initial shape so that a negative pressure is produced in the ink chamber and consequently the ink flows into the ink chamber from a supply source. In this case, air is also sucked into the nozzle as the latter is in communication with the ink chamber. When air is present in the nozzle, an ink jet in a desired quantity cannot be discharged. In order to overcome this problem, a high-voltage pulse having a very sharp leading edge is applied to the piezoelectric transducer so that a high mechanical output may be produced so as to quickly build up the pressure in the ink chamber, thereby discharging the ink jet or droplet overcoming the resistance of air entrapped in the nozzle. Thereafter, the pulse voltage is gradually lowered for a relatively long time interval so that the negative pressure produced in the ink chamber may be low, thereby avoiding the suction of air into the nozzle.

Meanwhile, unless a high-voltage pulse higher than a predetermined level is applied to the ink jet head, the latter cannot discharge the ink jet or droplet or the ink drips from the nozzle resulting in the contamination of the ink jet head and a recording medium. In general the video signal varies independently of the printing cycle. As a result, when the level of the video signal varies widely during the printing cycle, the high-voltage printing pulse is distorted or clipped so that it may not have a proper amplitude and a proper width. As a consequence, prior to the completion of the printing cycle, the negative pressure builds up in the ink chamber, resulting in the discharge of insufficient ink jet or droplet, dripping of ink from the nozzle and consequently the degradation of recording.

SUMMARY OF THE INVENTION

Accordingly, one of the objects of the present invention is to provide a circuit for driving an ink-on-demand type ink jet head which may substantially eliminate the degradation of recording and the dripping of ink from the nozzle due to the variation in level of the video signal, whereby high performance of the ink jet head and a clear and sharp recording may be ensured.

To the above and other ends, in a recording system wherein when the level of the video signal is high, the density of ink dots registered on a recording medium is high and vice versa, the video signal is compared with a reference voltage in a comparator so that when the video signal voltage is higher than the reference voltage the comparator delivers an enable signal. Meanwhile the peak value of the video signal is sampled and held in a sample-hold circuit, and a pulse synchronization circuit delivers a pulse output in synchronism with a printing sync pulse only when the enable signal is delivered. In response to the output pulse from the pulse synchronization circuit, the sample-hold circuit is periodically reset so that it may deliver to a high-voltage energization circuit a voltage pulse whose level is representative of the peak value held in the sample-hold circuit only during the printing sync pulse cycle when the enable signal is delivered. The high-voltage energization circuit amplifies the output from the sample-hold circuit so as to drive the ink jet head with the high-voltage pulse.

When the present invention is applied to a recording system wherein when the level of the video signal is low the density is high and vice versa, the video signal is inverted in polarity before it is applied to the comparator.

BRIEF DESCRIPTION OF THE DRAWINGS

FIG. 6 is a diagram of another embodiment of the present invention.

BRIEF DESCRIPTION OF THE PRIOR ART

Figure 1:
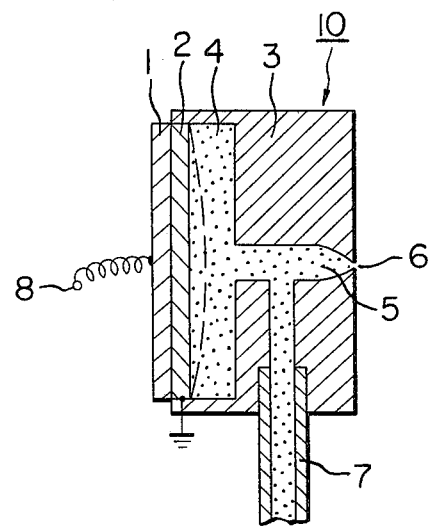
FIG. 1 is a vertical sectional view of an ink-on-demand type ink jet head which is driven by a circuit in accordance with the present invention.

FIG. 1 shows an ink jet head 10 to which is applied the present invention. The ink jet head 10 includes a piezoelectric transducer consisting of a piezoelectric crystal plate 1 and a diaphragm 2 made of a metal, an ink jet nozzle proper 3, an ink chamber 4, a nozzle 5 with an exit or a nozzle hole 6, an ink supply pipe 7 and an input terminal to which is impressed the printing pulse. When the high voltage pulse is applied to the input terminal 8, the piezoelectric transducer is deformed as indicated by the broken lines so that the ink in the chamber 4 is pressurized and the ink jet is discharged through the nozzle 5. When the pulse is removed, the piezoelectric transducer returns to its initial shape so that the ink chamber 4 is expanded to suck the ink through the ink supply pipe 7. In this case, the air is also sucked through the nozzle 5. The mechanical output of the piezoelectric transducer is therefore absorbed by the sucked air so that the ink jet in a desired volume cannot be discharged.

Figure 2:
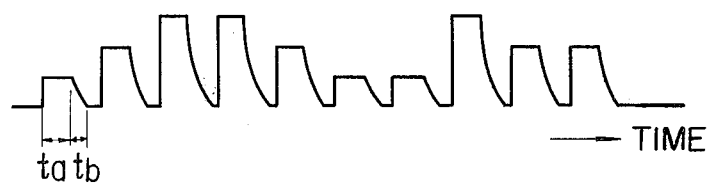
FIG. 2 shows the waveform of the high-voltage pulse applied to the ink jet head shown in FIG. 1.

In order to overcome this problem, the slope of the leading edge of the printing pulse is made very sharp as shown in FIG. 2 and the pulse width $t_a$ is so selected that the piezoelectric transducer may be deformed greatly so as to raise the pressure in the ink chamber 4 to a sufficiently high level, thereby discharging the ink jet through the nozzle hole 6. Thereafter, the voltage applied to the piezoelectric transducer is gradually lowered through a relatively long time interval $t_b$ so as to decrease the negative pressure produced in the ink chamber 4, thereby avoiding the suction of air through the nozzle hole 6.

Figure 3:
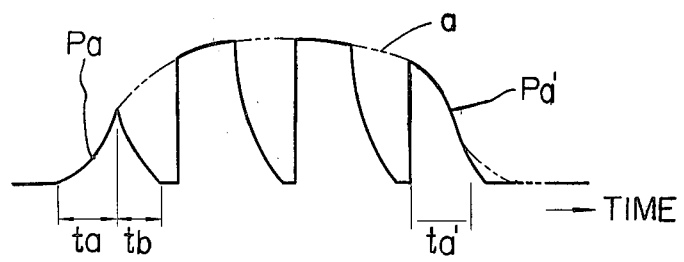
FIG. 3 shows the waveforms of the video signal and printing pulses in a prior art ink jet head driving circuit.

Unless a voltage higher than a predetermined level is applied to the piezoelectric transducer, the discharged ink jet or droplet cannot travel and impinge at a predetermined point. Furthermore, the ink drips from the nozzle hole 6, resulting in contamination of the ink jet and the recording medium. In general, the video signal varies independently of the printing cycle. When the level of the video signal a (indicated by two-dot chain lines in FIG. 3) varies widely during the printing cylcle $t_a$ or $t_a'$ as shown in FIG. 3, the printing pulse $p_a$ or $p_a'$ is deformed so that the printing pulse with a proper amplitude and a proper pulse width cannot be applied to the ink jet head. As a result, prior to the end of the printing cycle, the negative pressure builds up in the ink chamber 4 so that the ink jet in a desired quantity cannot be discharged.

DESCRIPTION OF THE PREFERRED EMBODIMENT

Figure 4:
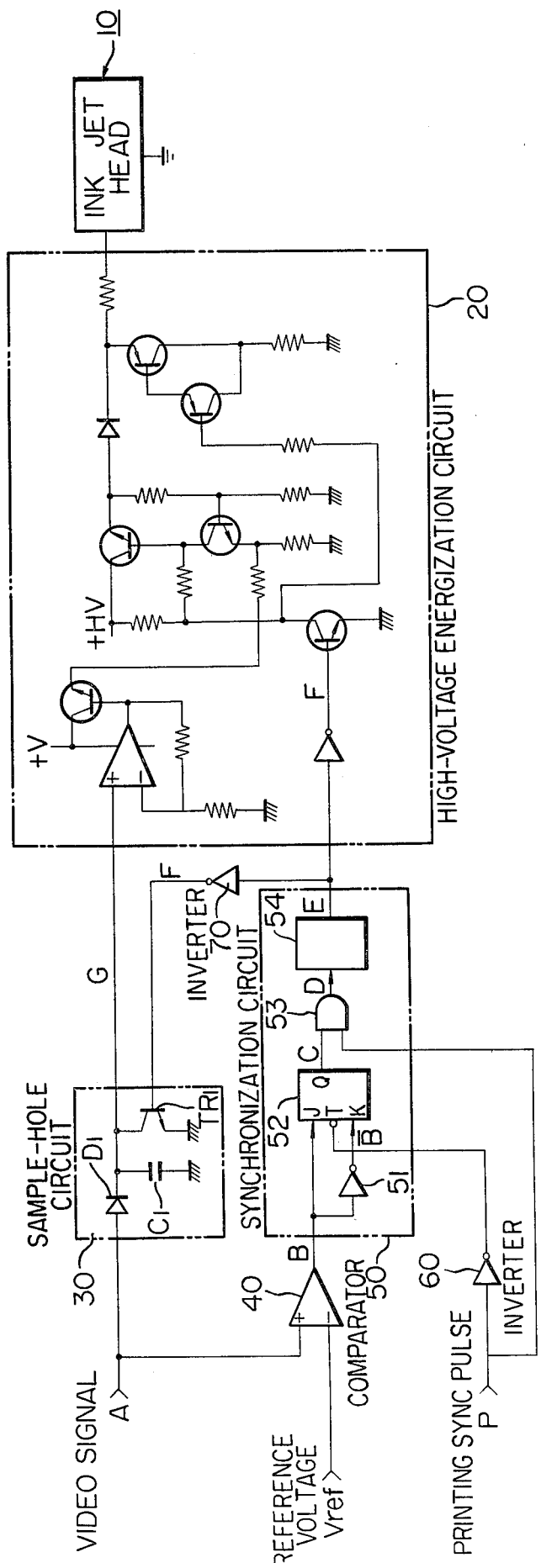
FIG. 4 is a diagram of an ink-on-demand type ink jet head driving circuit in accordance with the present invention.

Referring first to FIG. 4, a circuit of the present invention for driving the ink jet head 10 which is of the ink-on-demand type and is substantially similar in construction to that shown in FIG. 1 comprises a high-voltage energization circuit 20 which is of the conventional type and has a function of setting a rising time and a falling time of the output pulse; a sample-hold circuit 30, a comparator 40; and a pulse synchronization circuit 50.

In this embodiment, the sample-hold circuit 30 comprises a diode $D_1$, a capacitor $C_1$ and a transistor $TR_1$. The comparator 40 may be a Schmitt trigger or a differential amplifier. The pulse synchronization circuit 50 comprises an inverter 51, a flip-flop 52, an AND gate 53 and a monostable multivibrator 54.

Figure 5:
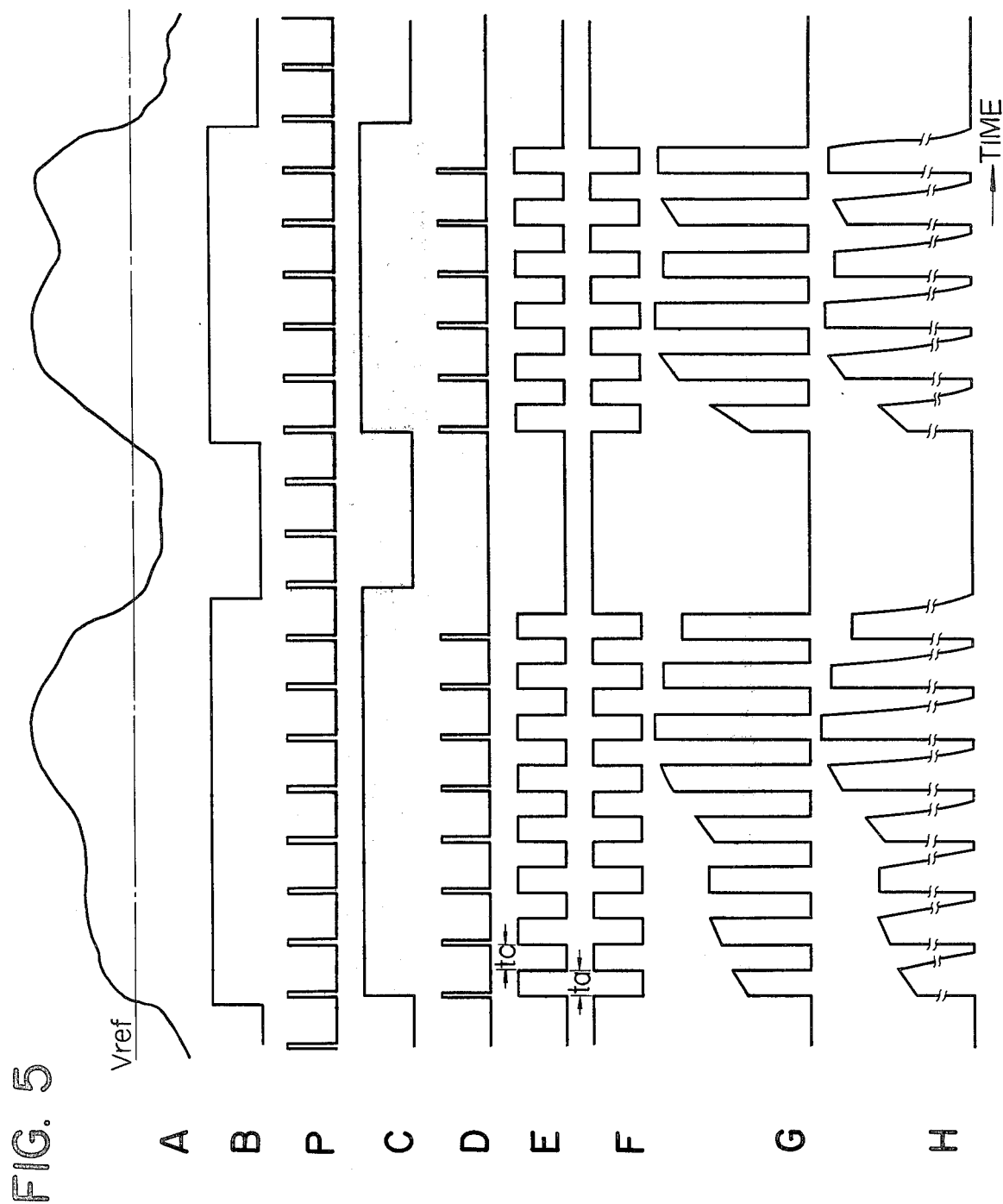
FIG. 5 shows the waveforms used for the explanation of the mode of operation thereof.

The video signal A (See FIG. 5A) is applied to the capacitor $C_1$ in the sample-hold circuit 30 so that only when the transistor $TR_1$ is disabled, the peak value of the video signal A is held on the capacitor $C_1$. The video signal A is also applied to the comparator 40 so as to be compared with a reference voltage Vref. The high-level output signal B (See FIG. 5B) is derived from the comparator 40 only when the voltage of the video signal A is higher than the reference voltage Vref and is applied to the J terminal of the flip-flop 52 and to the input terminal of the inverter 51 the output B of which is applied to the K terminal of the inverter 51. The printing sync pulse P (See FIG. 5P) is inverted by an inverter 60 and is applied to the T terminal of the flip-flop 52. The output C (See FIG. 5C) from the flip-flop 52 rises to a high level "1" when the video signal voltage is higher than the reference voltage Vref and after the printing sync pulse P has arrived. Under the conditions opposite to the above, the output C of the flip-flop 52 drops to a low level "0" upon arrival of the succeeding printing sync pulse P. Therefore, the output C of the flip-flop 52 remains at a high level "1" during the time interval equal to a multiple of the frequency of the printing sync pulse P. In addition to the video signal A and the printing pulse P, the output C from the flip-flop 52 is used to energize the ink jet head 10 so that the problems encountered in the prior art ink jet head driving circuits may be substantially overcome as will be described in more detail hereinafter.

The output C from the flip-flop 52 and the printing sync pulse P are applied to AND gate 53. Therefore the output D (See FIG. 5D) of AND gate 53 is the printing sync pulse or printing pulse derived only during a time interval for printing. In response to the output D, the monostable multivibrator 54 is triggered to generate the pulse E (See FIG. 5E) with a pulse width equal to $t_a$ shown in FIG. 2. The output E is inverted by an inverter 70 and the inverted signal F (See FIG. 5F) is applied to the reset terminal of the sample-hold circuit 30 or to the base of the transistor $TR_1$ so that the latter is disabled from a time interval $t_a$ when the output E of the monostable multivibrator 54 remains at a high level. When the output E is at a low level, the switching transistor $TR_1$ is enabled. As a result, the capacitor $C_1$ in the sample-hold circuit 30 remains charged only when the output E of the monostable multivibrator remains at a high level ($t_a$), but is discharged when the output E drops to a low level. Consequently, the output G (See FIG. 5G) of the sample-hold circuit 30 remains equal to the peak value of the video signal A only for a printing cycle ($t_a$), but drops to a predetermined low level during the nonprinting cycle $t_c$ (See FIG. 5E).

The pulse width of the output G representative of the peak value of the video signal A is constant and is determined by the pulse width of the output E of the monostable multivibrator 54. The pulse width of the output G will not vary even when the video signal A varies in amplitude. The pulse G with a constant pulse width and a crest value representative of the peak value of the video signal A is amplified by the high-voltage energization circuit 20 and is converted into the pulse H (See FIG. 5H) the waveshape of which is adapted to energize the ink jet head 10.

The reference voltage Vref is determined based upon the level of the video signal at which no ink drips from the nozzle of the ink jet head 10. Thus only when the level of the video signal A is so high that no ink dripping will occur, the printing pulse with a constant pulse width $t_a$ and a crest value representative of the peak value of the video signal A is derived through the pulse synchronization circuit 50 and the sample-hold circuit 30, and the high voltage pulse which is applied to the ink jet head 10 has a waveshape which may ensure the satisfactory operation of the ink jet head.

The ink jet head driving circuit described above is applied to a recording system wherein when the level of the video signal is high, the density is high and vice versa, but it is to be understood that the present invention may be equally applied to a recording system wherein when the level of the video signal is low the density is high and vice versa as will be described with reference to FIG. 6 hereinafter. Referring to FIG. 6, the video signal A is inverted by an inverter 80 and is applied to the sample-hold circuit 30 and the comparator 40.

What is claimed is:

1. An ink-on-demand type ink jet head driving circuit comprising
   (a) a comparator for comparing the video signal with a reference voltage and delivering a high-level output when the level of the video signal is higher than or equal to said reference voltage or a low-level output when the level of the video signal is lower than said reference voltage, (b) a pulse synchronization circuit for receiving the output from said comparator and a printing sync pulse and delivering an output pulse in synchronism with said printing sync pulse only when said pulse synchronization circuit has received said high-level or low-level output from said comparator, and (c) a sample-hold circuit for holding a peak value of the video signal, the output of said sample-hold circuit being applied to a high-voltage energization circuit for driving an ink jet head, the output pulse from said pulse synchronization circuit being applied to said sample-hold circuit so as to reset the peak value which said smaple-hold circuit holds.

2. An ink-on-demand type ink jet head driving circuit as set forth in claim 1 wherein said reference voltage is determined higher than a level of the video signal at which no ink will drip from the nozzle hole of said ink jet head.

3. An ink-on-demand type ink jet head driving circuit as set forth in claim 1 wherein in the case of a recording system wherein when the level of the video signal is high the density of the printed ink dots is high and vice versa, the output of said sample-hold circuit is applied to said high-voltage energization circuit only when the level of the video signal is higher than said reference voltage.

4. An ink-on-demand type ink jet head driving circuit as set forth in claim 1 wherein
in the case of a recording system wherein the level of the video signal is low, the density of the printed ink dots is high and vice versa, the video signal is inverted by an inverter and applied to said comparator for comparison with said reference voltage.

* * * * *